United States Patent [19]

Hahn

[11] 4,117,028
[45] Sep. 26, 1978

[54] NON-CURING SILICONE PRESSURE SENSITIVE ADHESIVES

[75] Inventor: James R. Hahn, Midland, Mich.

[73] Assignee: Dow Corning Corporation, Midland, Mich.

[21] Appl. No.: 789,398

[22] Filed: Apr. 21, 1977

[51] Int. Cl.$^2$ .................... C08L 43/04; C08L 83/10
[52] U.S. Cl. .................................. 260/825; 260/827
[58] Field of Search .......................................... 260/825

[56] References Cited

U.S. PATENT DOCUMENTS 3,528,940   9/1970   Modic .................................. 260/825
3,576,904   4/1971   Saam et al. ........................... 260/825

Primary Examiner—Allan Lieberman
Attorney, Agent, or Firm—Robert F. Fleming, Jr.

[57] ABSTRACT

Pressure sensitive adhesives which require no cure to develop maximum adhesive properties are obtained from mixtures of (1) from 30 to 70 weight percent of block copolymers of A styrenic monomers and B polydimethylsiloxane in which the styrenic blocks account for from 5 to 25 percent by weight of the total weight of the block copolymer and (2) from 30 to 70 percent by weight based on the total weight of (1) and (2) of a copolymer of $Me_3SiO_{.5}$ and $SiO_2$ units in which the mol ratio of $Me_3SiO_{.5}$ to $SiO_2$ is from 0.6:1 to 0.9:1. A typical example of (1) is a block copolymer of styrene and dimethylpolysiloxane.

4 Claims, No Drawings ns of this invention can be prepared
NON-CURING SILICONE PRESSURE SENSITIVE ADHESIVES

STATE OF THE ART

It is known that pressure sensitive adhesives can be prepared by mixing (2) with homopolymeric polydimethylsiloxane fluids or gums. However, these formulations require that the combination be cured using various kinds of catalysts or by heat in order to develop the maximum adhesive strength. For example, U.S. Pat. No. 2,736,712 shows the combination of a dimethylpolysiloxane gum and resin (2) cured with titanium ester or zirconium ester catalysts. U.S. Pat. 2,814,601 shows a fluid dimethylpolysiloxane plus (2) cured with a lead octoate catalyst. Canadian Pat. No. 808,719 shows the combination of a dimethylpolysiloxane gum and (2) cured with benzoyl peroxide. Finally U.S. Pat. No. 2,857,356 shows the combination of a polydimethylsiloxane fluid and (2) cured by heat.

There are applications, however, in which the application of heat to the pressure sensitive adhesive is not convenient or desirable. Therefore, there is need for a silicone pressure sensitive adhesive which retains the advantages of silicone adhesives without requiring heat cure.

It is an object of this invention to provide a silicone pressure sensitive adhesive which has excellent adhesive characteristics when applied to a surface and dried at room temperature.

BRIEF DESCRIPTION OF THE INVENTION

This invention relates to a composition suitable for use as a pressure sensitive adhesive consisting essentially of (1) from 30 to 70 percent by weight of a block copolymer consisting essentially of BAB or $(ABA)_n$ types where $n$ is an integer of 2 or greater, A is a polydimethylsiloxane block having at least 15 siloxane units, B is a polystyrenic block having at least 15 styrenic units per block, the percent by weight B being from 5 to 25 percent by weight of the total weight of A and B and (2) from 30 to 70 percent by weight based on the total weight of (1) and (2) of a benzene soluble copolymer of $SiO_2$ units and $Me_3SiO_{.5}$ units in which the mole ratio of $Me_3SiO_{.5}$ units to $SiO_2$ units is from about 0.6:1 to 0.9:1.

DETAILED DESCRIPTION OF THE INVENTION

The proportions of (1) and (2) set forth above represent the operative proportions of the ingredients for the preparation of pressure sensitive adhesives. However, the optimum proportions of (1) and (2) varies depending upon the amount of B in the block copolymer and also the type of B. For example, when B is a block of polystyrene, the optimum adhesive properties are obtained when (2) is employed in amount of from 50 to 55 percent by weight when there is 20 percent by weight B is (1), but at 10 percent by weight B in (1) the optimum amount of (2) is from 60 to 65 percent by weight. Also, it should be understood that optimum amount depends upon the property most desired in the adhesive. For example, when the adhesive is required to operate at elevated temperatures, better adhesion is obtained with 20 percent by weight B than with 10 percent by weight B. Here again, however, these proportions will vary depending upon the type of the styrenic block. In other words, with a higher melting styrenic block better performances at elevated temperatures will be obtained with the same weight percent of the styrenic block.

The compositions of this invention can be prepared by merely blending (1) and (2), preferably by using a common solvent such as toluene, xylene, or perchloroethylene. The combination in solution can then be coated on a substrate and by merely driving off the solvent, one obtains an operative pressure sensitive adhesive having maximum adhesive strength.

The materials (1) employed in this invention are well-known materials and can be prepared by any of the methods commonly known in the art. Specific patents teaching the preparation of such block copolymers are as follows: U.S. Pat. Nos. 3,678,126; 3,665,052; 3,483,270; and U.S. application Ser. No. 748,788, filed Dec. 9, 1976 (assigned to the assignee of this invention) all of which are hereby incorporated by reference.

Briefly, the copolymers of this invention can be prepared by polymerizing the styrenic monomer with an organoalkali metal compound, thereafter contacting the so-called living polymer with a dimethylcyclosiloxane, preferably the dimethylcyclotrisiloxane. The precise catalyst employed differs depending upon whether one is preparing a BAB polymer or a $(ABA)_n$ polymer. In the case of the former, one can use a monoalkali metal organo compound such as butyllithium to polymerize the styrenic monomer. This will give a styrenic polymer having a butyl group on one end and an alkali metal ion on the other. This polymer is then contacted with the organocyclosiloxane to form an organosiloxane block attached to the styrenic block. The alkali metal will now be on the end of the organosiloxane block so two of these can be coupled by reacting the polymer with a diorganochlorosilane such as dimethyldichlorosilane which will then couple the two organosiloxane blocks to form a BAB polymer.

When one wishes to form an $(ABA)_n$ polymer, the choice of a catalyst will be a dilithium or disodium organo compound such as, for example, dilithiostylbene or disodium diphenyl. This catalyst is used to polymerize the styrenic monomer and there is formed a living polymer with an alkali metal atom on each end of the chain. This polymer is then contacted with a cyclic dimethylsiloxane and a dimethylsiloxane block will form at each end of the styrenic block producing an ABA polymer. The latter is then coupled by reacting with a diorganodichlorosilane which produces the $(ABA)_n$ polymer.

The block size of B can be controlled by the ratio of catalysts employed to the styrenic monomer. The block size of A is controlled by the mol ratio of the cyclic diorganosiloxane to the styrenic block.

As is well known when the B block is alphamethylstyrene or its derivatives, it is necessary that the alphamethylstyrene block be capped on each end with a styrene block; that is, styrene or ring-substituted alkyl styrenes or ring-substituted halostyrenes. This prevents the alphamethylstyrene block from depolymerizing during formation of the organopolysiloxane block.

It has been found that operative pressure sensitive adhesives are obtained only when the percent by weight B ranges from 5 to 25 percent. When the percent by weight of B is 30 percent or greater, one obtains polymers which are not pressure sensitive when mixed with (12) and dried. Polymers containing 30 percent or more B are useful as hot melt adhesives either alone or in combination with (2). The molecular weight of (1) is not critical but best adhesive properties are generally obtained when the molecular weight is below 1 million.

As used in this invention, the term "styrenic" includes styrene, alphamethyl styrene and their ring-substituted derivatives such as alkyl-substituted derivatives, such as vinyl toluene, ethyl styrene, propyl styrene, t-butyl styrene or octyl styrene or halo-substituted ring styrenic monomers such as chloro styrene, bromo styrene, chloroalphamethyl styrene, etc.

The ingredient (2) employed herein is also well known and can be prepared by the procedure shown in U.S. Pat. No. 2,676,182 which involves the reaction of silica sols prepared from sodium silicate with trimethylchlorosilane or hexamethyldisiloxane and by the method of U.S. Pat. No. 2,857,356 which involves the cohydrolysis of trimethylchlorosilane with tetraethoxysilane. However prepared, the ratio of trimethylsiloxy groups to $SiO_2$ units should be within the range of about 0.6 to 0.9. When the ratio exceeds 0.9, the materials are not operative for pressure sensitive adhesives. Resins (2) are characterized by being benzene soluble.

The term "consisting essentially of" when employed herein in conjunction with block copolymer (1) means that the polymer consists essentially of the styrenic monomer block and the dimethylpolysiloxane block, but that the polymers can contain minor amounts of other polymer units which do not affect their essential characteristics. For example, the organic portion of the organometallic catalyst employed to polymerize the styrene blocks may be incorporated in the polymer chain. Also, when the ABA blocks are coupled with diorganodichlorosilanes, one may employ dichlorosilanes other than dimethyldichlorosilanes such as, for example, trifluoropropylmethyldichlorosilane or phenylmethyldichlorosilane in which case these units would be incorporated in the siloxane block in very small amounts. With regard to resin (2), the term means that other units besides trimethylsiloxy units and $SiO_2$ units may be present in these resins in small amounts. For example, vinyldimethylsiloxane units or some diorganosiloxane units such as dimethylsiloxane, phenylmethylsiloxane or vinylmethylsiloxane.

The pressure sensitive adhesives of this invention can be applied to a wide variety of substrates and are characterized by the fact that they adhere to practically any known surface including such difficult substrates as polytetrafluoroethylene or substrates coated with silicone release agents. Thus, the pressure sensitive adhesives of this invention can be used to make pressure sensitive adhesive tapes in which the substrate could be metallic, siliceous or organoplastic in nature.

The adhesion figures given below are in ounces per inch* and were determined in accordance with ASTM-D-1000. The hold time tests where also run in accordance with this procedure except that the hold times used a 3000 g. load for ½ sq. inch (1.6 sq. cm.).
*Refers to the width of the tape used to measure the adhesion.

The Wetzel tack was tested in accordance with ASTM Bulletin No. 221 pgs. 64–68 (April 1957).

All of the resins (2) employed herein were commercial copolymers of trimethylsiloxane and $SiO_2$ having a trimethylsiloxy to $SiO_2$ ratio of about 0.66.

The following examples are illustrative only and should not be construed as limiting the invention which is properly delineated in the appended claims. Me is used herein for the methyl radical.

EXAMPLE 1

Block copolymer (1) employed in this example contains 20 percent by weight styrene and 80 percent by weight dimethylpolysiloxane. It was prepared by polymerizing styrene with dilithiostylbene to give a calculated block size of 10,400 molecular weight. The living polymer was then reacted with hexamethylcyclotrisiloxane and the resulting polymer was coupled with trifluoropropylmethyldichlorosilane to give a $(ABA)_n$ block copolymer having a molecular weight of 298,000*.
*All molecular weights are weight average.

25 g. of this block copolymer were dissolved in 1,1,1-trichloroethane and a 71 percent solution of (2) in xylene was added in amount to give 50 percent by weight of (1) and 50 percent by weight of (2). A thin film was put on aluminum foil and dried at room temperature to give a film which measured about 0.82 mils. After sitting at room temperature for three hours, the tape was applied to a metal plate and the properties were found to be as follows: Adhesion, 42 oz. per inch (453 g. per cm.), Hold Time > 42 hours, and the adhesive was tacky to the touch.

EXAMPLE 2

This example shows the effect of varying the amount of (2). In each case a solution of the adhesive was applied to a 2 mil aluminum foil and dried to give a film of adhesive 4 to 6 mils thick. The foil was applied to a metal substrate and the adhesion determined as above.

The 20 percent by weight styrene block copolymer was that employed in Example 1. The 10 percent by weight styrene block copolymer was prepared by polymerizing styrene with dilithium stylbene to give a block molecular weight size of 8000 and the living polymer was then reacted with hexamethylcyclotrisiloxane and coupled with trifluoropropylmethyldichlorosilane to give a block copolymer having a molecular weight of 298,000.

Each of these block copolymers was formulated with varying amounts of (2) as shown in the table below and the various adhesive properties were determined.

TABLE I

| % By Wt. (2) | Adhesion in oz./inch | Wetzel Tack in grams | Hold Time |
|---|---|---|---|
| 20% By Wt. Styrene | | | |
| 40 | 25 (260 g.)* | 45 | 3 min. |
| 45 | 36 (390 g.) | 85 | >2 hrs. |
| 50 | 48 (525 g.) | 68 | >2 hrs. |
| 55 | 48 (525 g.) | 72 | >33 hrs. |
| 60 | 36 (390 g.) | 18 | >2 hrs. |
| 65 | 24 (248 g.) | 18 | >2 hrs. |
| 10% By Wt. Styrene | | | |
| 30 | 12 (134 g.) | 35 | 0 |
| 40 | 28 (312 g.) | 60 | 0.3 min. |
| 50 | 45 (504 g.) | 65 | 18 hrs. |
| 60 | 48 (525 g.) | 80 | >14 days |
| 65 | 49 (548 g.) | 45 | >25 hrs. |
| 70 | 30 (333 g.) | 49 | >2 hrs. |

*Per cm. width.

EXAMPLE 3

This example shows variation in adhesive properties (determined as in Example 2) with block size of the styrene blocks.

Two dimethylpolysiloxane styrene block copolymers containing 10 weight percent styrene were prepared as above except that in one the block size of the polystyrene was 6600 molecular weight and the styrene blocks in the other had an average molecular weight of 14,000. Each of these copolymers was mixed with varying amounts of resin (2) as in Example 1 and the results are shown in Table II.

TABLE II

| % By Wt. (2) | Adhesion in oz./inch | Hold Time | Wetzel Tack in grams |
|---|---|---|---|
| Styrene Block 6000 Molecular Wt. | | | |
| 40 | 28 (312 g.) | 0.3 | 60 |
| 50 | 45 (504 g.) | 18 hrs. | 65 |
| 60 | 48 (525 g.) | >14 days | 80 |
| Styrene Block 14,000 Molecular Wt. | | | |
| 50 | 67 (750 g.) | 0.6 | 75 |
| 60 | 82 (915 g.) | 49 min. | 110 |
| 65 | 103 (1150 g.) | 119 min. | 85 |

EXAMPLE 4

Three 20 percent by weight styrene-dimethylpolysiloxane block copolymers were prepared by the procedure shown above which had the following properties: Polymer I had a molecular weight of 390,000 and a styrene block molecular weight of 11,400. Polymer II had a molecular weight of 1,660,000 and a styrene block molecular weight of 14,900. Polymer III had a molecular weight of 750,000 and a styrene block molecular weight of 17,700. Each of these copolymers was formulated with 55 percent by weight of resin (2) and the properties of the copolymers are given in Table III below.

TABLE III

| Block Copolymer No. | Adhesion in ox./inch* | Hold Time Min. | Wetzel Tack in grams |
|---|---|---|---|
| I | 47 (505 g.) | >120 | 65 |
| II | 17 (190 g.) | >120 | 0 |
| III | 57.3 (615 g.) | >120 | 0 |

*Determined as in Example 2.

This data shows that block copolymers having molecular weights less than 1 million give better adhesives than those having molecular weights above 1 million.

EXAMPLE 5

This example shows the operativeness of alphamethylstyrene-dimethylpolysiloxane block copolymers. The block copolymer employed in this example was prepared in accordance with the procedure of U.S. application Ser. No. 748,788, filed Dec. 9, 1976. The copolymer contained 8.4 percent by weight alphamethylstyrene, 1.7 percent by weight tertiary butyl styrene and 89.9 percent by weight dimethylpolysiloxane and was in the form of alphamethylstyrene blocks capped with tertiary butyl styrene and dimethylpolysiloxane blocks.

The calculated alphamethylstyrene block size was 8000 molecular weight. 25 g. of this block copolymer were mixed with 50 g. of xylene and 25 g. of resin (2) and spread thinly on a sheet of aluminum foil and the solvent removed by evaporation in 3 hours at room temperature and 10 minutes at 150° C. The coated aluminum foil was applied to clean aluminum plate and the force necessary to peel the foil from the plate was found to be 450 g. per inch (177 g. per cm.).

EXAMPLE 6

This example shows the use of alphamethylstyrene block capped with styrene and dimethylpolysiloxane block copolymer which was prepared in accordance with the method of U.S. Pat. No. 3,665,052. The blockcopolymer contained 10 percent alphamethylstyrene, 2 percent styrene and 88 percent dimethylpolysiloxane and had a molecular weight of 560,000. The block copolymer was mixed with resin (2) in amount of 60 percent by weight (2) and 40 percent by weight of block copolymer. The resulting material was applied to aluminum and found to have the following adhesive properties. Adhesion, 36 oz. per inch (400 g. per cm.); Hold Time > 24 hours.

That which is claimed is:

1. A composition suitable for use as a pressure sensitive adhesive consisting essentially of
   (1) from 30 to 70 percent by weight of a block copolymer consisting essentially of BAB or $(ABA)_n$ types where $n$ is an integer of 2 or greater, A is a polydimethylsiloxane block having at least 15 siloxane units, B is a polystyrenic block having at least 15 styrenic units per block, the percent by weight B being from 5 to 25 percent of the total weight of A and B and
   (2) from 30 to 70 percent by weight based on the weight of (1) and (2) of a benzene soluble copolymer of $SiO_2$ units and $Me_3SiO_{.5}$ units in which the mol ratio of $Me_3SiO_{.5}$ units to $SiO_2$ units is from about 0.6:1 to 0.9:1.

2. The composition in accordance with claim 1 in which (1) is of the $(ABA)_n$ type in which B is polystyrene and which the weight average molecular weight of the polymer is less than 1,000,000.

3. The composition in accordance with claim 1 in which (1) is of the $(ABA)_n$ type in which B is alphamethylstyrene, t-butyl styrene copolymer having a weight average molecular weight less than 1 million.

4. The composition in accordance with claim 1 in which (1) is of the $(ABA)_n$ type in which B is alphamethylstyrene, styrene copolymer having a weight average molecular weight less than 1 million.

* * * * *

UNITED STATES PATENT AND TRADEMARK OFFICE
CERTIFICATE OF CORRECTION

PATENT NO. : 4,117,028
DATED : September 26, 1978
INVENTOR(S) : James R. Hahn

It is certified that error appears in the above-identified patent and that said Letters Patent are hereby corrected as shown below:

In the ABSTRACT, line 9; the line reading "copolymer of $Mw_3SiO_{.5}$ and $SiO_2$ units in which the mol" should read "copolymer of $Me_3SiO_{.5}$ and $SiO_2$ units in which the mol"

In Column 2, line 66; the number "(12)" should read "(2)

In Column 3, line 58; the line reading "used a 3000 g. load for 1/2 sq. inch (1.6 sq. cm.)." should read "used a 3000 g. load for 1/4 sq. inch (1.6 sq. cm.)."

In Column 5, line 35; in Table III, column heading "Adhesion in ox./inch*" should read "Adhesion in oz./inch*"

Signed and Sealed this

Twenty-ninth Day of December 1981

[SEAL]

Attest:

GERALD J. MOSSINGHOFF

Attesting Officer

Commissioner of Patents and Trademarks